US007359857B2

(12) United States Patent
Mahe et al.

(10) Patent No.: US 7,359,857 B2
(45) Date of Patent: Apr. 15, 2008

(54) METHOD AND SYSTEM OF CORRECTING SPECTRAL DEFORMATIONS IN THE VOICE, INTRODUCED BY A COMMUNICATION NETWORK

(75) Inventors: Gaël Mahe, Paris (FR); André Gilloire, Lannion (FR)

(73) Assignee: France Telecom, Paris (FR)

( * ) Notice: Subject to any disclaimer, the term of this patent is extended or adjusted under 35 U.S.C. 154(b) by 857 days.

(21) Appl. No.: 10/723,851

(22) Filed: Nov. 25, 2003

(65) Prior Publication Data

US 2004/0172241 A1 Sep. 2, 2004

(30) Foreign Application Priority Data

Dec. 11, 2002 (FR) .................................. 02 15618

(51) Int. Cl.
*G10L 19/14* (2006.01)
*G10L 15/06* (2006.01)

(52) U.S. Cl. ...................... 704/228; 704/245; 704/246

(58) Field of Classification Search ........ 704/224–225, 704/228, 246
See application file for complete search history.

(56) References Cited

U.S. PATENT DOCUMENTS

| | | | | | |
|---|---|---|---|---|---|
| 4,310,721 | A | * | 1/1982 | Manley et al. | 704/203 |
| 5,123,048 | A | * | 6/1992 | Miyamae et al. | 704/246 |
| 5,727,124 | A | * | 3/1998 | Lee et al. | 704/233 |
| 5,806,029 | A | | 9/1998 | Buhrke et al. | 704/244 |
| 5,839,103 | A | * | 11/1998 | Mammone et al. | 704/232 |
| 5,862,156 | A | * | 1/1999 | Huszar et al. | 704/242 |
| 5,895,447 | A | * | 4/1999 | Ittycheriah et al. | 704/231 |
| 5,905,969 | A | * | 5/1999 | Mokbel et al. | 704/203 |
| 5,915,235 | A | * | 6/1999 | DeJaco et al. | 704/234 |
| 6,157,909 | A | * | 12/2000 | Mauuary et al. | 704/228 |
| 6,216,107 | B1 | * | 4/2001 | Rydbeck et al. | 704/500 |

(Continued)

FOREIGN PATENT DOCUMENTS

FR 2 822 999 A 10/2002

OTHER PUBLICATIONS

Lee et al. "A frequency warping approach to speaker normalization", IEEE Transactions on Speech and Audio Processing, 6(1), Jan. 1998, pp. 49-60.*

(Continued)

*Primary Examiner*—Patrick N. Edouard
*Assistant Examiner*—James S. Wozniak
(74) *Attorney, Agent, or Firm*—Cohen Pontani; Lieberman & Pavane LLP

(57) ABSTRACT

A technique for correcting the voice spectral deformations introduced by a communication network. Prior to the operation of equalization of the voice signal of a speaker, the constitution of classes of speakers is communicated, with one voice reference per class. Then, for a given speaker, the classification of this speaker is communicated, that is to say his allocation to a class from predefined classification criteria in order to make a voice reference which is closest to his own correspond to him. Then, for that given speaker, communicating the equalization of the digitized signal of the voice of the speaker carried out with, as a reference spectrum, the voice reference of the class to which the speaker has been allocated. This technique applies to the correction of the timbre of the voice in switched telephone networks, in ISDN networks and in mobile networks.

12 Claims, 7 Drawing Sheets

U.S. PATENT DOCUMENTS 6,266,633 B1 * 7/2001 Higgins et al. ............. 704/224

OTHER PUBLICATIONS

Moreno et al, "Continuous Recognition of Large-Vocabulary Telephone-Quality Speech", Proceedings of the Spoken Language Systems Technology Workshop, Jan. 1995, pp. 70-73.*

G. Mahé et al., "Correction of the voice timbre distortions on the telephone network", EUROSPEECH 2001, Sep. 3-7, 2001, pp. 1867-1870.

G. Mahé, "Correction centralisée des distortions spectrales de la parole sur les réseaux téléphoniques", Dec. 19, 2002, Université de Rennes 1, Rennes, France, pp. 3-7 and 87-116.

* cited by examiner

--PRIOR ART--

--PRIOR ART--

--PRIOR ART--

--PRIOR ART--

--PRIOR ART--

--PRIOR ART--

--PRIOR ART--

--PRIOR ART--

METHOD AND SYSTEM OF CORRECTING SPECTRAL DEFORMATIONS IN THE VOICE, INTRODUCED BY A COMMUNICATION NETWORK

BACKGROUND OF THE INVENTION

1. Field of the Invention

The invention concerns a method for the multireference correction of voice spectral deformations introduced by a communication network. It also concerns a system for implementing the method.

The aim of the present invention is to improve the quality of the speech transmitted over communication networks, by offering means for correcting the spectral deformations of the speech signal, deformations caused by various links in the network transmission chain.

The description which is given of this hereinafter explicitly makes reference to the transmission of speech over "conventional" (that is to say cabled) telephone lines, but also applies to any type of communication network (fixed, mobile or other) introducing spectral deformations into the signal, the parameters taken as a reference for specifying the network having to be modified according to the network.

2. Description of Prior Art

The various deformations encountered in the case of the switched telephone network (STN) will be stated below.

1.1. Degradations in the Timbre of the Voice on the STN Network:

FIG. 1 depicts a diagram of an STN connection. The speech emitted by a speaker is transmitted by a sending terminal 10, is transported by the subscriber line 20, undergoes an analogue to digital conversion 30 (law A), transmitted by the digital network 40, undergoes a digital (law A) to analogue conversion 50, is transmitted by the subscriber link 60, and passes through the receiving terminal 70 in order finally to be received by the destination person.

Each speaker is connected by an analogue line (twisted pair) to the closest telephone exchange. This is a base band analogue transmission referenced 1 and 3 in FIG. 1. The connection between the exchanges follows an entirely digital network. The spectrum of the voice is affected by two types of distortion during the analogue transmission of the base band signal.

The first type of distortion is the bandwidth filtering of the terminals and the points of access to the digital part of the network. The typical characteristics of this filtering are described by UIT-T under the name "intermediate reference system" (IRS) (UIT-T, Recommendation P.48, 1988). These frequency characteristics, resulting from measurements made during the 1970s, are tending however to become obsolete. This is why the UIT-T has recommended since 1996 using a "modified" IRS (UIT-T, Recommendation P.830, 1996), the nominal characteristic of which is depicted in FIG. 2 for the transmission part and in FIG. 3 for the receiving part. Between 200 and 3400 Hz, the tolerance is ±2.5 dB; below 200 Hz, the decrease in the characteristic of the global system must be at least 15 dB per octave. The transmission and reception parts of the IRS are called respectively, according to the UIT-T terminology, the "transmitting system" and the "receiving system".

The second distortion affecting the voice spectrum is the attenuation of the subscriber lines. In a simple model of the local analogue line (given in a CNET Technical Note NT/LAA/ELR/289 by Cadoret, 1983), it is considered that this introduces an attenuation of the signal whose value in dB depends on its length and is proportional to the square root of the frequency. The attenuation is 3 dB at 800 Hz for an average line (approximately 2 km), 9.5 dB at 800 Hz for longer lines (up to 10 km). According to this model, the expression for the attenuation of a line, depicted in FIG. 4, is:

$$A_{dB}(f) = A_{dB}(800\text{ Hz})\sqrt{\frac{f}{800}} \qquad (0.1)$$

To these distortions there is added the anti-aliasing filtering of the MIC coder (ref 30). The latter is typically a 200-3400 Hz bandpass filter with a response which is almost flat over the bandwidth and high attenuation outside the band, according to the template in FIG. 5 for example (National Semiconductor, August 1994: Technical Documentation TP3054, TP3057).

Finally, the voice suffers spectral distortion as depicted in FIG. 6 for the various combinations of three types of analogue line in transmission and reception (that is to say 6 distortions), assuming equipment complying with the nominal characteristic of the modified SRI. The voice thus appears to be stifled if one of the analogue lines is long and in all cases suffers from a lack of "presence" due to the attenuation of the low-frequency components.

1.2. Degradations in the Timbre of the Voice on the Isdn Network and the GSM Mobile Network In ISDN and the GSM network, the signal is digitised as from the terminal. The only analogue parts are the transmission and reception transducers associated with their respective amplification and conditioning chains. The UIT-T has defined frequency efficacy templates for transmission depicted in FIG. 7, and for reception depicted in FIG. 8, valid both for cabled digital telephones (UIT-T, Recommendation P.310, May 2000) and mobile digital or wireless terminals (UIT-T, Recommendation P.313, September 1999).

Moreover, for GSM networks, it is recognised that coding and decoding slightly modify the spectral envelope of the signal. This alteration is shown in FIG. 9 for pink noise coded and then decoded in EFR (Enhanced Full Rate) mode.

The effect of these filterings on the timbre is mainly an attenuation of the low-frequency components, less marked however than in the case of STN.

The invention concerns the correction of these spectral distortions by means of a centralized processing, that is to say a device installed in the digital part of the network, as indicated in FIG. 10 for the STN.

The objective of a correction of the voice timbre is that the voice timbre in reception is as close as possible to that of the voice emitted by the speaker, which will be termed the original voice.

2. Prior Art

Compensation for the spectral distortions introduced into the speech signal by the various elements of the telephone connection is at the present time allowed by devices with an equalization base. The latter can be fixed or be adapted according to the transmission conditions.

2.1. Fixed Equalization

Centralised equalization devices were proposed in the patents U.S. Pat. Nos. 5,333,195 (Duane O. Bowker) and 5,471,527 (Helena S. Ho). These equalizers are fixed filters which restore the level of the low frequencies attenuated by the transmitter. Bowker proposes for example a gain of 10 to 15 dB on the 100-300 Hz band. These methods have two drawbacks:

The equalizer compensates only for the filtering of the transmitter, so that on reception the low-frequency components remain greatly attenuated by the IRS reception filtering.

This fixed equalization compensates for the average transmission conditions (transmission system and line). If the actual conditions are too different (for example if the analogue lines are long) the device does not sufficiently correct the timbre, or even impairs it more than the connection without equalization.

2.2. Adaptive Equalization

The invention described in the patent U.S. Pat. No. 5,915,235 (Andrew P De Jaco) aims to correct the non-ideal frequency response of a mobile telephone transducer. The equalizer is described as being placed between the analogue to digital converter and the CELP coder but can be equally well in the terminal or in the network. The principle of equalization is to bring the spectrum of the received signal close to an ideal spectrum. Two methods are proposed.

The first method (illustrated by FIG. 4 in the aforementioned patent of De Jaco) consists of calculating long-term autocorrelation coefficients $R_{LT}$:

$$R_{LT}(n,i)=\alpha R_{LT}(n-1,i)+(1-\alpha)R(n,i), \qquad (0.2)$$

with $R_{LT}(n,i)$ the $i^{th}$ long-term autocorrelation coefficient to the $n^{th}$ frame, R(n,i) the $i^{th}$ autocorrelation coefficient specific to the $n^{th}$ frame, and $\alpha$ a smoothing constant fixed for example at 0.995. From these coefficients there are derived the long-term LPC coefficients, which are the coefficients of a whitening filter. At the output of this filter, the signal is filtered by a fixed signal which imprints on it the ideal long-term spectral characteristics, i.e. those which it would have at the output of a transducer having the ideal frequency response. These two filters are supplemented by a multiplicative gain equal to the ratio between the long-term energies of the input of the whitener and the output of the second filter.

The second method, illustrated by FIG. 5 of the aforementioned De Jaco patent, consists of dividing the signal into sub-bands and, for each sub-band, applying a multiplicative gain so as to reach a target energy, this gain being defined as the ratio between the target energy of the sub-band and the long-term energy (obtained by a smoothing of the instantaneous energy) of the signal in this sub-band.

These two methods have the drawback of correcting only the non-ideal response of the transmission system and not that of the reception system.

The object of the device of the patent U.S. Pat. No. 5,905,969 (Chafik Mokbel) is to compensate for the filtering of the transmission signal and of the subscriber line in order to improve the centralised recognition of the speech and/or the quality of the speech transmitted. As presented by FIG. 3*a* in Mokbel, the spectrum of the signal is divided into 24 sub-bands and each sub-band energy is multiplied by an adaptive gain. The matching of the gain is achieved according to the stochastic gradient algorithm, by minimisation of the square error, the error being defined as the difference between the sub-band energy and a reference energy defined for each sub-band. The reference energy is modulated for each frame by the energy of the current frame, so as to respect the natural short-term variations in level of the speech signal. The convergence of the algorithm makes it possible to obtain as an output the 24 equalized sub-band signals.

If the application aimed at is the improvement in the voice quality, the equalized speech signal is obtained by inverse Fourier transform of the equalized sub-band energy.

The Mokbel patent does not mention any results in terms of improvement in the voice quality, and recognises that the method is sub-optimal, in that it uses a circular convolution. Moreover, it is doubtful that a speech signal can be reconstructed correctly by the inverse Fourier transform of band energies distributed according to the MEL scale. Finally, the device described as not correct the filtering of the reception signal and of the analogue reception line.

The compensation for the line effect is achieved in the "Mokbel" method of cepstral subtraction, for the purpose of improving the robustness of the speech recognition. It is shown that the cepstrum of the transmission channel can be estimated by means of the mean cepstrum of the signal received, the latter first being whitened by a pre-accentuation filter. This method affords a clear improvement in the performance of the recognition systems but is considered to be an "off-line" method, 2 to 4 seconds being necessary for estimating the mean cepstrum.

2.3. Another state of the art combines a fixed pre-equalization with an adapted equalization and has been the subject of the filing of a patent application FR 2822999 by the applicant. The device described aims to correct the timbre of the voice by combining two filters.

A fixed filter, called the pre-equalizer, compensates for the distortions of an average telephone line, defined as consisting of two average subscriber lines and transmission and reception systems complying with the nominal frequency responses defined in UIT-T, Recommendation P.48, App.I, 1988. Its frequency response on the Fc-3150 Hz band is the inverse of the global response of the analogue part of this average connection, Fc being the limit equalization low frequency.

This pre-equalization is supplemented by an adapted equalizer, which adapts the correction more precisely to the actual transmission conditions. The frequency response of the adapted equalizer is given by:

$$|EQ(f)| = \frac{1}{|S\_RX(f)\cdot L\_RX(f)|}\sqrt{\frac{\gamma_{ref}(f)}{\gamma_x(f)}}, \qquad (0.3)$$

with L_RX the frequency response of the reception line, S_RX the frequency response of the reception system and $\gamma_x$(f) the long-term spectrum of the output x of the pre-equalizer.

The long-term spectrum is defined by the temporal mean of the short-term spectra of the successive frames of the signal; $\gamma_{ref(f)}$, referred to as the reference spectrum, is the mean spectrum of the speech defined by the UIT (UIT-T/P.50/App. I, 1998), taken as an approximation of the original long-term spectrum of the speaker. Because of this approximation, the frequency response of the adapted equalizer is very irregular and only its general shape is pertinent. This is why it must be smoothed. The adapted equalizer being produced in the form of a time filter RIF, this smoothing in the frequency domain is obtained by a narrow windowing (symmetrical) of the pulsed response.

This method makes it possible to restore a timbre close to that of the original signal on the equalization band (Fc-3150 Hz), but:

for some speakers, the approximation of their original long-term spectrum by means of the reference spectrum is very rough, so that the equalizer introduces a perceptible distortion;

the high smoothing of the frequency response of the equalizer, made necessary by the approximation error, prevents fine spectral distortions from being corrected.

SUMMARY OF THE INVENTION

The aim of the invention is to remedy the drawbacks of the prior art. Its object is a method and system for improving the correction of the timbre by reducing the approximation error in the original long-term spectrum of the speakers.

To this end, it is proposed to classify the speakers according to their long-term spectrum and to approximate this not by a single reference spectrum but by one reference spectrum per class. The method proposed makes it possible to carry out an equalization processing able to determine the class of the speaker and to equalize according to the reference spectrum of the class. This reduction in the approximation error makes it possible to smooth the frequency response of the adapted equalizer less strongly, making it able to correct finer spectral distortions.

The object of the present invention is more particularly a method of correcting spectral deformations in the voice, introduced by a communication network, comprising an operation of equalization on a frequency band (F1-F2), adapted to the actual distortion of the transmission chain, this operation being performed by means of a digital filter having a frequency response which is a function of the ratio between a reference spectrum and a spectrum corresponding to the long-term spectrum of the voice signal of the speakers, principally characterised in that it comprises:

prior to the operation of equalization of the voice signal of a speaker communicating:

the constitution of classes of speakers with one voice reference per class, then, for a given speaker communicating:

the classification of this speaker, that is to say his allocation to a class from predefined classification criteria in order to make a voice reference which is closest to his own correspond to him, the equalization of the digitised signal of the voice of the speaker carried out with, as a reference spectrum, the voice reference of the class to which the said speaker has been allocated.

According to another characteristic, the constitution of classes of speakers comprises:

the choice of a corpus of N speakers recorded under non-degraded conditions and the determination of their long-term frequency spectrum, the classification of the speakers in the corpus according to their partial cepstrum, that is to say the cepstrum calculated from the long-term spectrum restricted to the equalization band (F1-F2) and applying a predefined classification criterion to these cepstra in order to obtain K classes, the calculation of the reference spectrum associated with each class so as to obtain a voice reference corresponding to each of the classes.

According to another characteristic, the reference spectrum on the equalization frequency band (F1-F2), associated with each class, is calculated by Fourier transform of the center of the class defined by its partial cepstrum.

According to another characteristic, the classification of a speaker comprises:

use of the mean pitch of the voice signal and of the partial cepstrum of this signal as classification parameters, the application of a discriminating function to these parameters in order to classify the said speaker.

According to the invention the method also comprises a step of pre-equalization of the digital signal by a fixed filter having a frequency response in the frequency band (F1-F2), corresponding to the inverse of a reference spectral deformation introduced by the telephone connection.

According to another characteristic, the equalization of the digitised signal of the voice of a speaker comprises:

the detection of a voice activity on the line in order to trigger a concatenation of processings comprising the calculation of the long-term spectrum, the classification of the speaker, the calculation of the modulus of the frequency response of the equalizer filter restricted to the equalization band (F1-F2) and the calculation of the coefficients of the digital filter differentiated according to the class of the speaker, from this modulus, the control of the filter with the coefficients obtained, the filtering of the signal emerging from the pre-equalizer by the said filter.

According to another characteristic, the calculation of the modulus (EQ) of the frequency response of the equalizer filter restricted to the equalization band (F1-F2) is achieved by the use of the following equation:

$$|EQ(f)| = \frac{1}{|S\_RX(f)\cdot L\_RX(f)|}\sqrt{\frac{\gamma_{ref}(f)}{\gamma_x(f)}}, \quad (0.3)$$

in which $\gamma_{ref}(f)$ is the reference spectrum of the class to which the said speaker belongs, and in which L_RX is the frequency response of the reception line, S_RX is the frequency response of the reception signal and $\gamma_x(f)$ the long-term spectrum of the input signal x of the filter.

According to a variant, the calculation of the modulus of the frequency response of the equalizer filter restricted to the equalization band (F1-F2) is done using the following equation:

$$C_{eq}^P = C_{ref}^P - C_x^P - C_{S\_RX}^P - C_{L\_RX}^P, \quad (0.13)$$

in which $C_{eq}^P$, $C_x^P$, $C_{S\_RX}^P$ and $C_{L\_RX}^P$ are the respective partial cepstra of the adapted equalizer, of the input signal x of the equalizer filter, of the reception system and of the reception line, $C_{ref}^P$ being the reference partial cepstrum, the center of the class of the speaker. The modulus (EQ) restricted to the band F1-F2 is then calculated by discrete Fourier transform of $C_{eq}^P$.

Another object of the invention is a system for correcting voice spectral deformations introduced by a communication network, comprising adapted equalization means in a frequency band (F1-F2) which comprise a digital filter whose frequency response is a function of the ratio between a reference spectrum and a spectrum corresponding to the long-term spectrum of a voice signal, principally characterised in that these means also comprise:

means of processing the signal for calculating the coefficients of the digital signal provided with:

a signal processing unit for calculating the modulus of the frequency response of the equalizer filter restricted to the equalization band (F1-F2) according to the following equation:

$$|EQ(f)| = \frac{1}{|\text{S\_RX}(f)\cdot \text{L\_RX}(f)|}\sqrt{\frac{\gamma_{ref}(f)}{\gamma_x(f)}}, \tag{0.3}$$

in which $\gamma_{ref}(f)$ is the reference spectrum, which may be different from one speaker to another and which corresponds to a reference for a predetermined class to which the said speaker belongs, and in which L_RX is the frequency response of the reception line, S_RX the frequency response of the reception signal and $\gamma_x(f)$ the long-term spectrum of the input signal x of the filter;

- a second processing unit for calculating the pulsed response from the frequency response modulus thus calculated, in order to determine the coefficients of the filter differentiated according to the class of the speaker.

According to another characteristic, the first processing unit comprises means of calculating the partial cepstrum of the equalizer filter according to the equation:

$$C_{eq}^{P}=C_{ref}^{P}-C_{x}^{P}-C_{S\_RX}^{P}-C_{L\_RX}^{P}, \tag{0.13}$$

in which $C_{eq}^P$, $C_x^P$, $C_{S\_RX}^P$ and $C_{L\_RX}^P$ are the respective partial cepstra of the adapted equalizer, of the input signal x of the equalizer filter, of the reception signal and of the reception line, $C_{ref}^P$ being the reference partial cepstrum, the center of the class of the speaker, the modulus of (EQ) restricted to the band F1-F2 is then calculated by discrete Fourier transform of $C_{eq}^P$.

According to another characteristic, the first processing unit comprises a sub-assembly for calculating the coefficients of the partial cepstrum of a speaker communicating and a second sub-assembly for effecting the classification of this speaker, this second sub-assembly comprising a unit for calculating the pitch $F_0$, a unit for estimating the mean pitch from the calculated pitch $F_0$, and a classification unit applying a discriminating function to the vector x having as its components the mean pitch and the coefficients of the partial cepstrum for classifying the said speaker.

According to the invention, the system also comprises a pre-equalization, the signal equalized from reference spectra differentiated according to the class of the speaker being the output signal x of the pre-equalizer.

BRIEF DESCRIPTION OF THE DRAWINGS

Other particularities and advantages of the invention will emerge clearly from the following description, which is given by way of illustrative and non-limiting example and which is made with regard to the accompanying figures, which show.

DETAILED DESCRIPTION OF THE DRAWINGS

Figure 1:
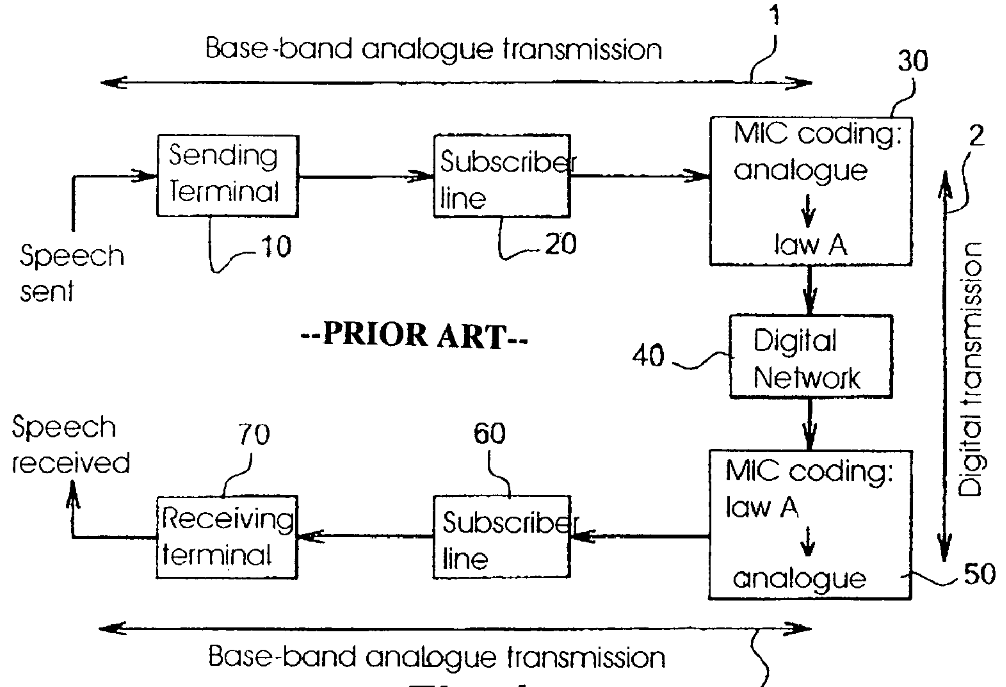
FIG. 1, a diagrammatic telephone connection for a switched telephone network (STN), FIG. 2, the transmission frequency response curve of the modified intermediate reference system IRS, FIG. 3, the reception frequency response curve of the modified intermediate reference system IRS, FIG. 4, the frequency response of the subscriber lines according to their length, FIG. 5, the template of the anti-aliasing filter of the MIC coder, FIG. 6, the spectral distortions suffered by the speech on the switched telephone network with average IRS and various combinations of analogue lines, FIG. 7, the transmission template for the digital terminals, FIG. 8, the reception template for the digital terminals, FIG. 9, the spectral distortion introduced by GSM coding/decoding in EFR (Enhanced Full Rate) mode, FIG. 10, the diagram of a communication network with a system for correcting the speech distortions, FIG. 11, the steps of calculating the partial cepstrum, FIG. 12, the classification of the partial cepstra according to the variance criterion, FIGS. 13*a* and 13*b*, the long-term spectra corresponding to the centers of the classes of speakers respectively for men and women, FIG. 14, the frequency characteristics of the filterings applied to the corpus in order to define the learning corpus, FIG. 15, the frequency response of the pre-equalizer for various frequencies Fc, FIG. 16, the scheme for implementing the system of correction by differentiated equalization per class of speaker, FIG. 17, a variant execution of the system according to FIG. 16.
Figure 2:
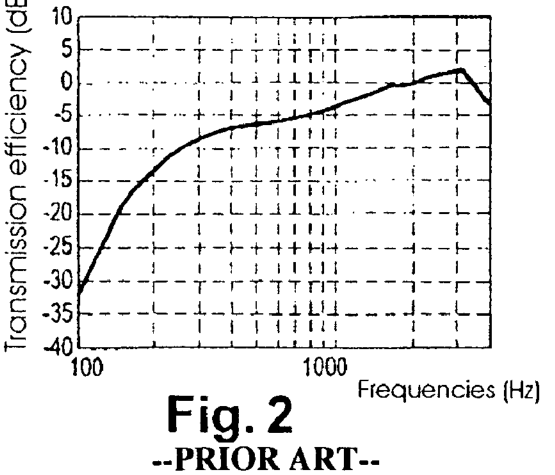
Figure 3:
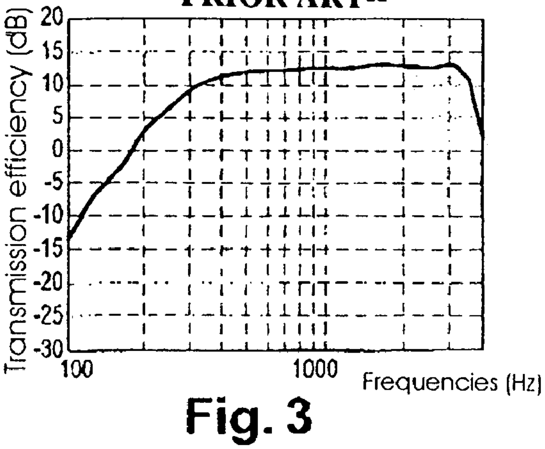
Figure 4:
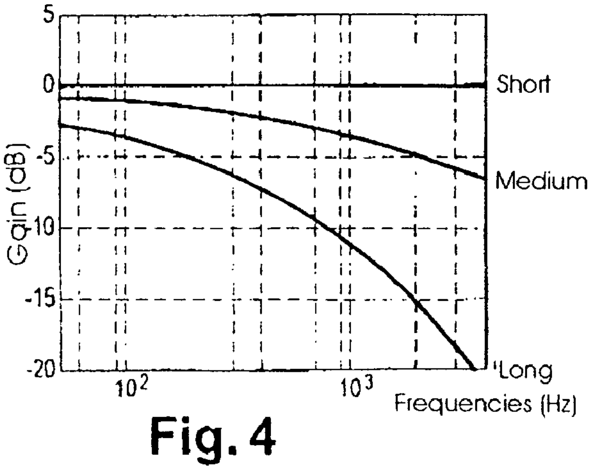
Figure 5:
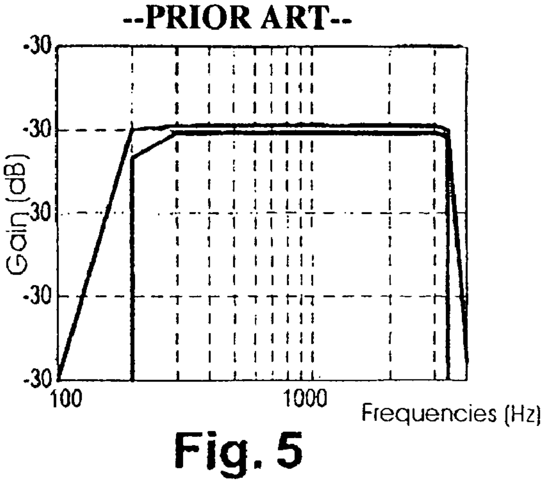
Figure 6:
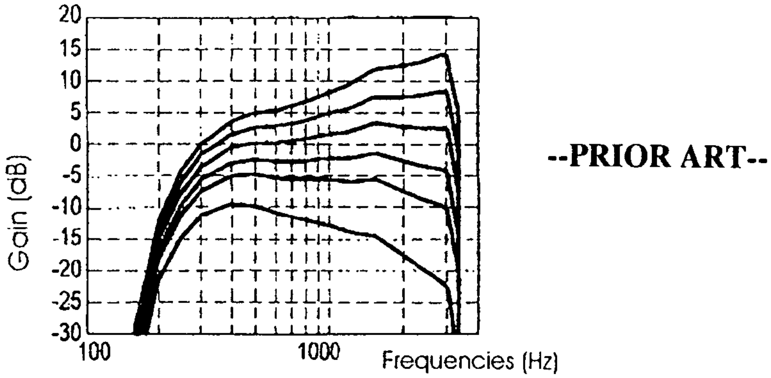
Figure 7:
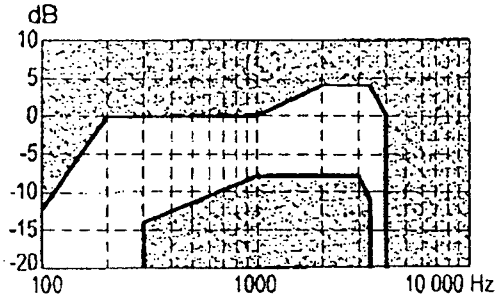
Figure 8:
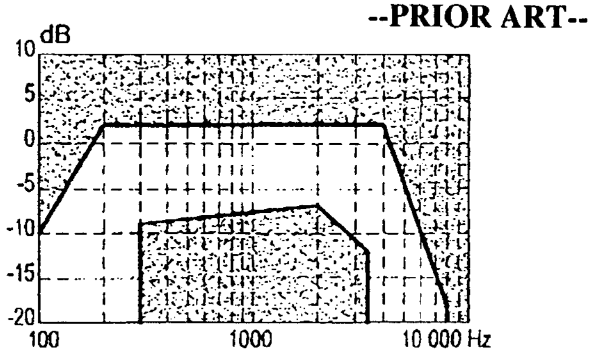
Figure 9:
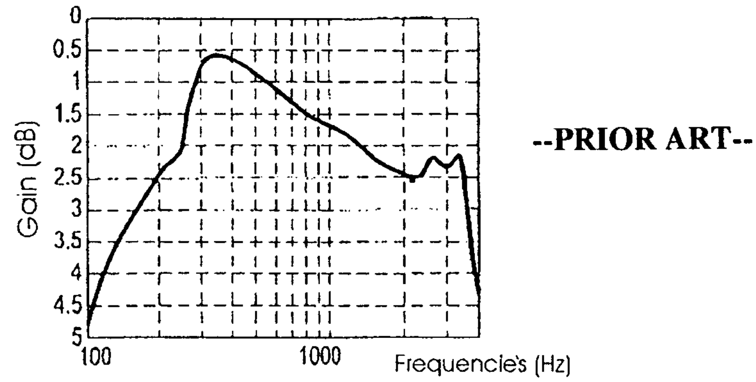

Throughout the following the same references entered on the drawings correspond to the same elements.

The description which follows will first of all present the prior step of classification of a corpus of speakers according to their long-term spectrum. This step defines K classes and one reference per class.

A concatenation of processings makes it possible to process the speech signal (as soon as a voice activity is detected by the system) for each speaker in order on the one hand to classify the speakers, that is to say to allocate them to a class according to predetermined criteria, and on the other hand to correct the voice using the reference of the class of the speaker.

Prior step of classification of the speakers.

Choice of the Class Definition Corpus.

The reference spectrum being an approximation of the original long-term spectrum of the speakers, the definition of the classes of speakers and their respective reference spectra requires having available a corpus of speakers recorded under non-degraded conditions. In particular, the long-term spectrum of a speaker measured on this recording must be able to be considered to be its original spectrum, i.e. that of its voice at the transmission end of a telephone connection.

Definition of the Individual: the Partial Cepstrum

The processing proposed makes it possible to have available, in each class, a reference spectrum as close as possible to the long-term spectrum of each member of the class. However, only the part of the spectrum included in the equalization band F1-F2 is taken into account in the adapted equalization processing. The classes are therefore formed according to the long-term spectrum restricted to this band.

Moreover, the comparison between two spectra is made at a low spectral resolution level, so as to reflect only the spectral envelope. This is why the space of the first cepstral coefficients of order greater than 0 (the coefficient of order 0 representing the energy) is preferably used, the choice of the number of coefficients depending on the required spectral resolution.

The "long-term partial cepstrum", which is denoted Cp, is then determined in the processing as the cepstral representation of the long-term spectrum restricted to a frequency band. If the frequency indices corresponding respectively to the frequencies F1 and F2 are denoted k1 and k2 and the long-term spectrum of the speech is denoted $\gamma$, the partial cepstrum is defined by the equation:

$$C^p=TFD^{-1}(10\log(\gamma(k_1\ldots k_2)\circ\gamma(k_2-1\ldots k_1+1))) \quad (0.4)$$

where o designates the concatenation operation.

The inverse discrete Fourier transform is calculated for example by IFFT after interpolation of the samples of the truncated spectrum so as to achieve a number of power samples of 2. For example, by choosing the equalization band 187-3187 Hz, corresponding to the frequency indices 5 to 101 for a representation of the spectrum (made symmetrical) on 256 points (from 0 to 255) the interpolation is made simply by interposing a frequency line (interpolated linearly) every three lines in the spectrum restricted to 187-3187 Hz.

Figure 11:
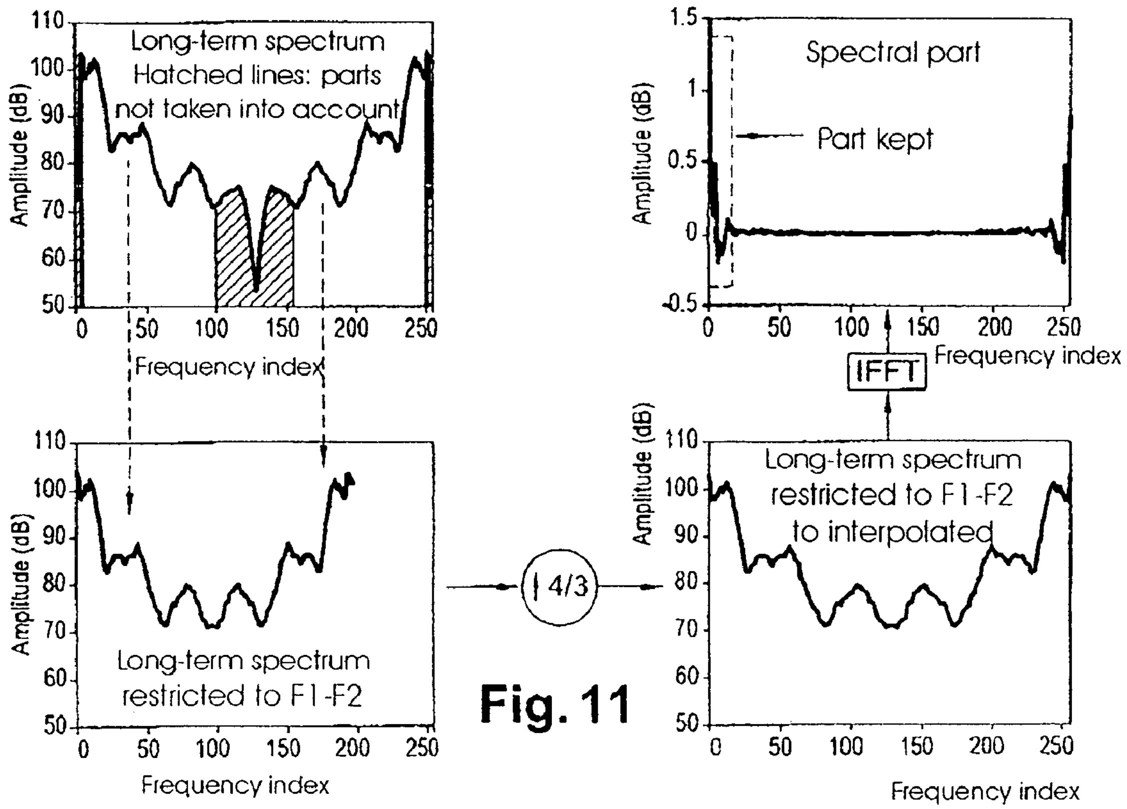

The steps of the calculation of the partial cepstrum are shown in FIG. 11.

For the cepstral coefficients to reflect the spectral envelope but not the influence of the harmonic structure of the spectrum of the speech on the long-term spectra, the high-order coefficients are not kept. The speakers to be classified are therefore represented by the coefficients of orders 1 to L of their long-term partial cepstrum, L typically being equal to 20.

The Classification.

The classes are formed for example in a non-supervised manner, according to an ascending hierarchical classification.

This consists of creating, from N separate individuals, a hierarchy of partitionings according to the following process: at each step, the two closest elements are aggregated, an element being either a non-aggregated individual or an aggregate of individuals formed during a previous step. The proximity between two elements is determined by a measurement of dissimilarity which is called distance. The process continues until the whole population is aggregated. The hierarchy of partitionings thus created can be represented in the form of a tree like the one in FIG. 12, containing N−1 imbricated partitionings. Each cut of the tree supplies a partitioning, which is all the finer, the lower the cut.

In this type of classification, as a measurement of distance between two elements, the intra-class inertia variation resulting from their aggregation is chosen. A partitioning is in fact all the better, the more homogeneous are the classes created, that is to say the lower the intra-class inertia. In the case of a cloud of points xi with respective masses mi, distributed in q classes with respective centers of gravity gq, the intra-class inertia is defined by:

$$I_{intra}=\sum_q\sum_{i\in q}m_i\|x_i-g_q\|^2. \quad (0.5)$$

The intra-class inertia, zero at the initial step of the calculation algorithm, inevitably increases with each aggregation.

Use is preferably made of the known principle of aggregation according to variance. According to this principle, at each step of the algorithm used, the two elements are sought whose aggregation produces the lowest increase in intra-class inertia.

The partitioning thus obtained is improved by a procedure of aggregation around the movable centers, which reduces the intra-class variance.

The reference spectrum, on the band F1-F2, associated with each class is calculated by Fourier transform of the center of the class.

Example of Classification.

Figure 12:
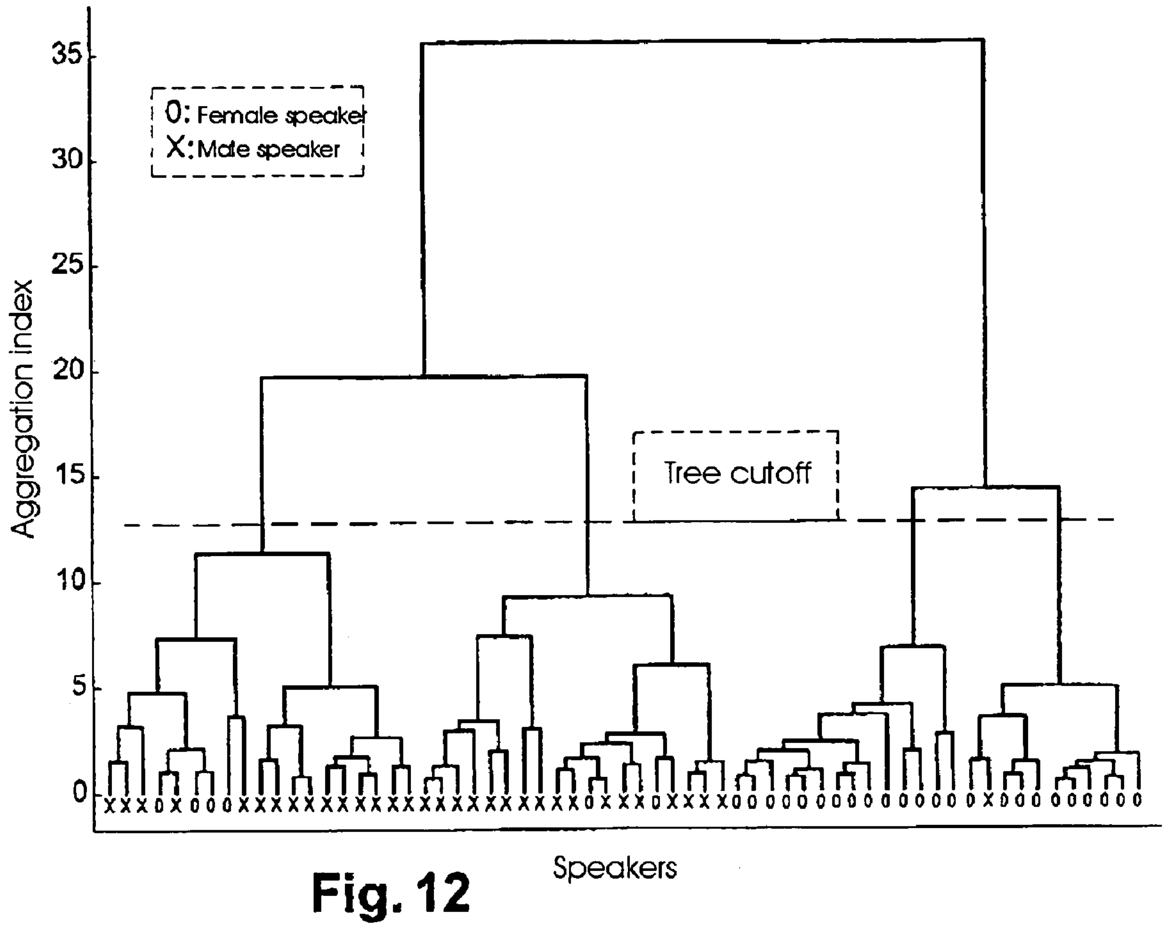

The processing described above is applied to a corpus of 63 speakers. The classification tree of the corpus is shown in FIG. 12. In this representation, the height of a horizontal segment aggregating two elements is chosen so as to be proportional to their distance, which makes it possible to display the proximity of the elements grouped together in the same class. This representation facilitates the choice of the level of cutoff of the tree and therefore of the classes adopted. The cutoff must be made above the low-level aggregations, which group together close individuals, and below the high-level aggregations, which associate clearly distinct groups of individuals.

In this way, four classes are clearly obtained (K=4). These classes are very homogeneous from the point of view of the sex of the speakers, and a division of the tree into two classes shows approximately one class of men and one class of women.

The consolidation of this partitioning by means of an aggregation procedure around the movable centers results in four classes of cardinals 11, 18, 18 and 16, more homogeneous than before from the point of view of the sex: only one man and two women are allocated to classes not corresponding to their sex.

Figure 13A:
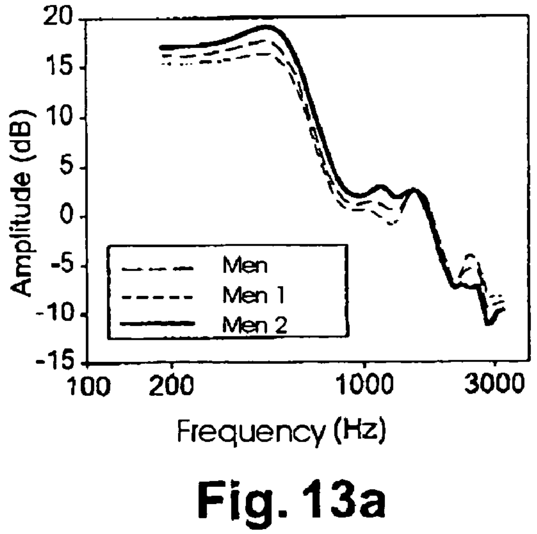
Figure 13B:
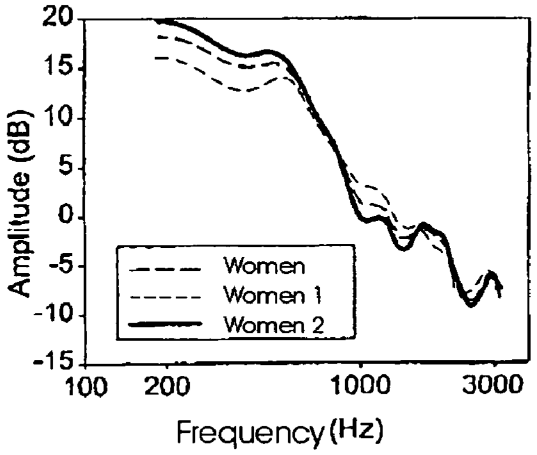

The spectra restricted to the 187-3187 Hz band corresponding to the centers of these classes are shown in FIGS. 13*a* and 13*b* for the men and women classes as well as for their respective sub-classes. These spectra, the results of the classification, are used as a multiple reference by the adapted equalizer.

Use of Classification Criteria for the Speakers

The classes of speakers being defined, the processing provides for the use of parameters and criteria for allocating a speaker to one or other of the classes.

This allocation is not carried out simply according to the proximity of the partial cepstrum with one of the class centers, since this cepstrum is diverted by the part of the telephone connection upstream of the equalizer.

It is advantageously proposed to use classification criteria which are robust to this diversion. This robustness is ensured both by the choice of the classification parameters and by that of the classification criteria learning corpus.

Preferably the Classification Parameters Average Pitch and Partial Cepstrum are Used The classes previously defined are homogeneous from the point of view of the sex. The average pitch being both fairly discriminating for a man/woman classification and insensitive to the spectral distortions caused by a telephone connection, and is therefore used as a classification parameter conjointly with the partial cepstrum.

Choice of the Classification Criteria Learning Corpus

A discrimination technique is applied to these parameters, for example the usual technique of discriminating linear analysis.

Other known techniques can be used such as a non-linear technique using a neural network.

If N individuals are available, described by dimension vectors p and distributed a priori in K classes, the discriminating linear analysis consists of:

- firstly, seeking the K−1 independent linear functions which best separate the K classes. It is a case of determining which are the linear combinations of the p components of the vectors which minimise the intra-class variance and maximise the inter-class variance;

secondly, determining the class of a new individual by applying the discriminating linear functions to the vector representing him.

In the present case, the vectors representing the individuals have as their components the pitch and the coefficients 1 to L (typically L=20) of the partial cepstrum. The robustness of the discriminating functions to the deviation of the cepstral coefficients is ensured both by the presence of the pitch in the parameters and by the choice of the learning corpus. The latter is composed of individuals whose original voice has undergone a great diversity of filtering representing distortions caused by the telephone connections.

More precisely, from a corpus of original voices (non-degraded) of N speakers, there is defined a corpus of N vectors of components $\lfloor \overline{F}_0; C^p(1); \ldots ; C^p(L) \rfloor$, with $\overline{F}_0$ the mean pitch and $C^p$ the partial cepstrum. The construction of the learning corpus of the said functions consists of defining a set of M cepstral biases which are each added to each partial cepstrum representing a speaker in the original corpus, which makes it possible to obtain a new corpus of NM individuals.

These biases in the domain of the partial cepstrum correspond to a wide range of spectral distortions of the band F1-F2, close to those which may result from the telephone connection.

Figure 14:
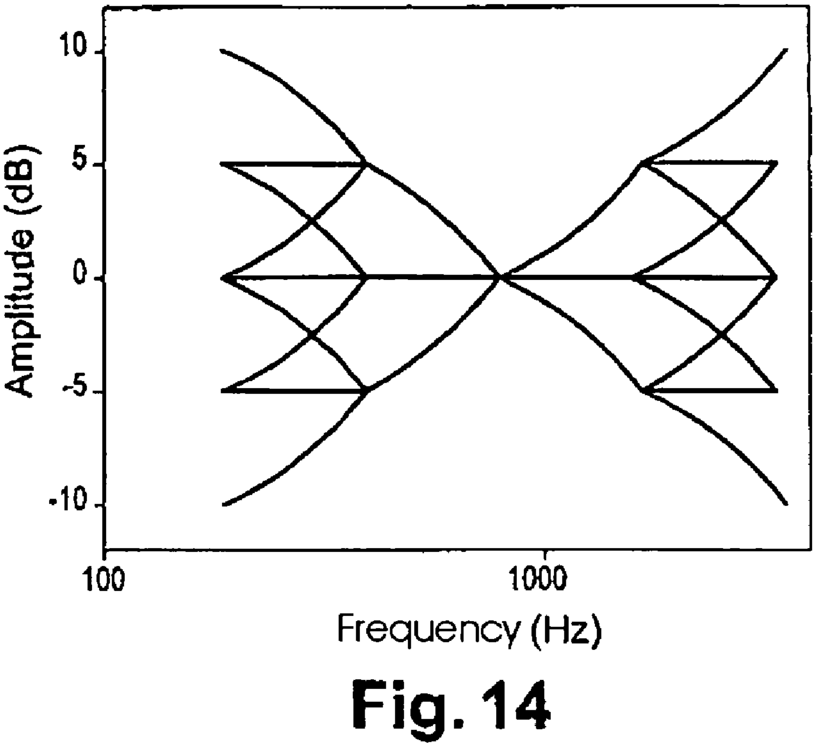

By way of example, the set of frequency responses depicted in FIG. 14 is proposed for the 187-3187 Hz band: each frequency response corresponds to a path from left to right in the lattice. The amplitude of their variations on this band does not exceed 20 dB, like extreme characteristics of the transmission and line systems.

From these 81 frequency characteristics there are calculated the 81 corresponding biases in the domain of the partial cepstrum, according to the processing described for the use of equation (0.4). By the addition of these biases to the corpus of 63 speakers previously used, a learning corpus is obtained including 5103 individuals representing various conditions (speaker, filtering of the connection).

In the case of classification by discriminating linear analysis:

Application of the Classification Criteria

Let $(a^k)1 \leqq k \leqq K-1$ be the family of discriminating linear functions defined from the learning corpus. A speaker represented by the vector $x = \lfloor \overline{F}_0; C^p(1); \ldots ; CP(L) \rfloor$ is allocated to the class q if the conditional probability of q knowing a(x), denoted P(q|a(x)), is maximum, a(x) designating the vector of components $(a^k(x))1 \leqq k \leqq K-1$. According to Bayes' theorem, $$P(q \mid a(x)) = \frac{P(a(x) \mid q)P(q)}{P(a(x))}. \qquad (0.6)$$

Consequently P(q|a(x)) is proportional to P(a(x)|q)P(q). In the subspace generated by the K−1 discriminating functions, on the assumption of a multi-Gaussian distribution of the individuals in each class, the density of probability of a(x) within the class q has:

$$f_q(x) = \frac{1}{(2\pi)^{\frac{K-1}{2}} \sqrt{|S_q}} \exp\left(-\frac{1}{2}\left(a(x) - a\left(\overline{x}^q\right)\right) S_q^{-1} \left(a(x) - a\left(\overline{x}^q\right)\right)\right), \qquad (0.7)$$

where $\overline{x}^p$ is the center of the class q, |Sq| designates the determinant of the matrix Sq, and Sq is the matrix of the covariances of a within the class q, of generic element $\sigma^q$jk, which can be estimated by:

$$\sigma_{jk}^q = \frac{1}{N_q} \sum_{j=1}^{N_q} \left(a^j(x^i) - a^j\left(\overline{x}^q\right)\right)\left(a^k(x^i) - a^k\left(\overline{x}^q\right)\right). \qquad (0.8)$$

The individual x will be allocated to the class q which maximises fq(x) P(q), which amounts to minimising on q the function sq(x) also referred to as the discriminating score:

$$s_q(x) = (a(x) - a(\overline{x}^q)) S_q^{-1} (a(x) - a(\overline{x}^q)) + \log(|S_q|) - 2 \log(P(q)), \qquad (0.9)$$

Figure 10:
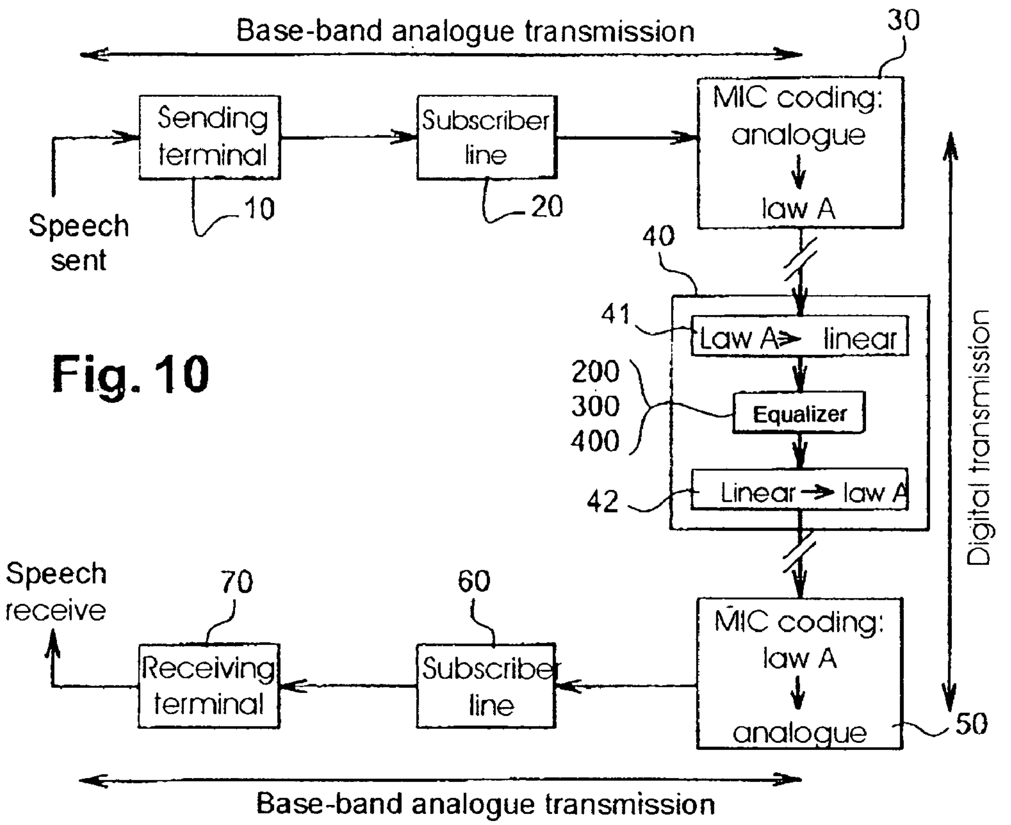

The correction method proposed is implemented by the correction system (equalizer) located in the digital network 40 as illustrated in FIG. 10.

Figure 16:
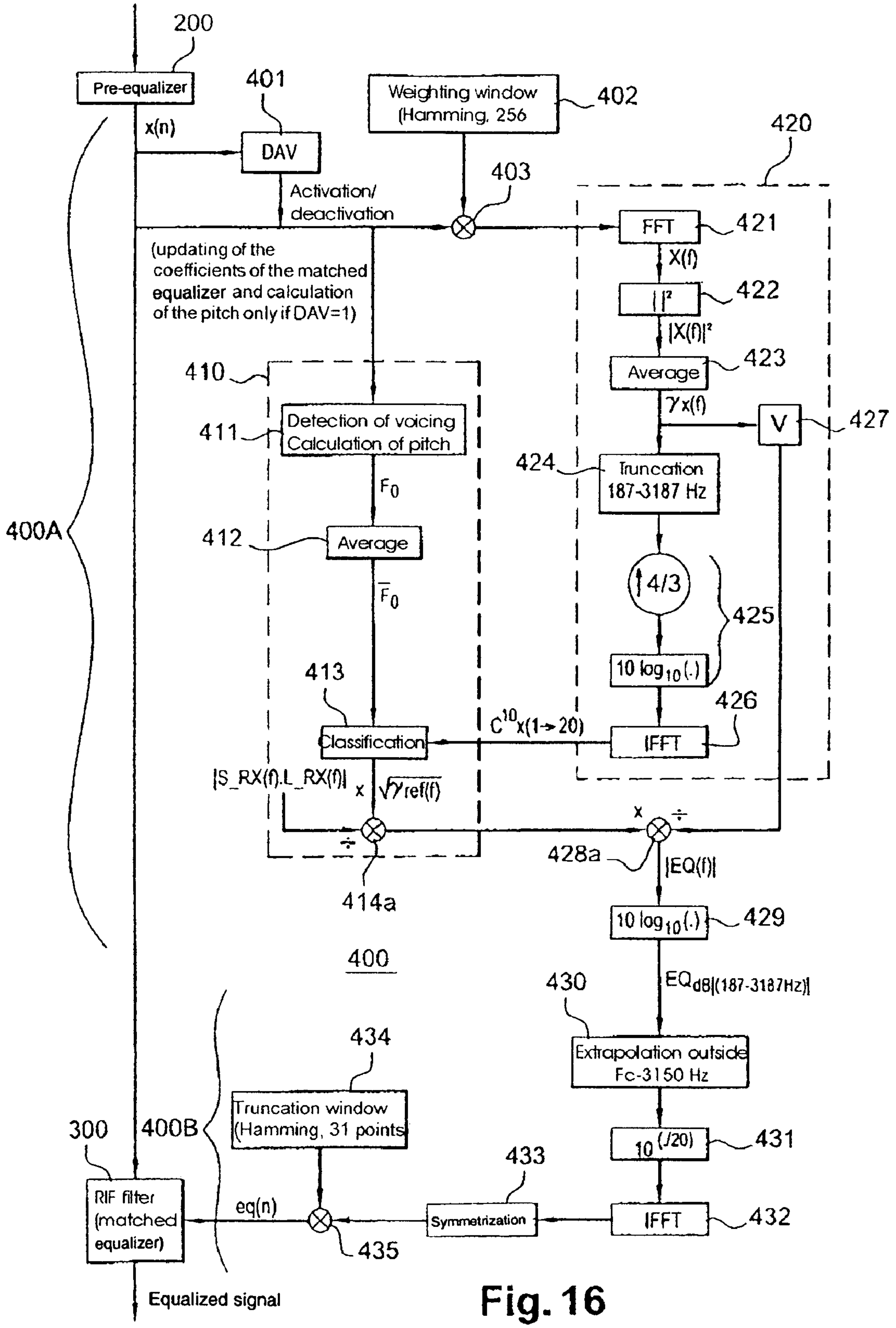
Figure 17:
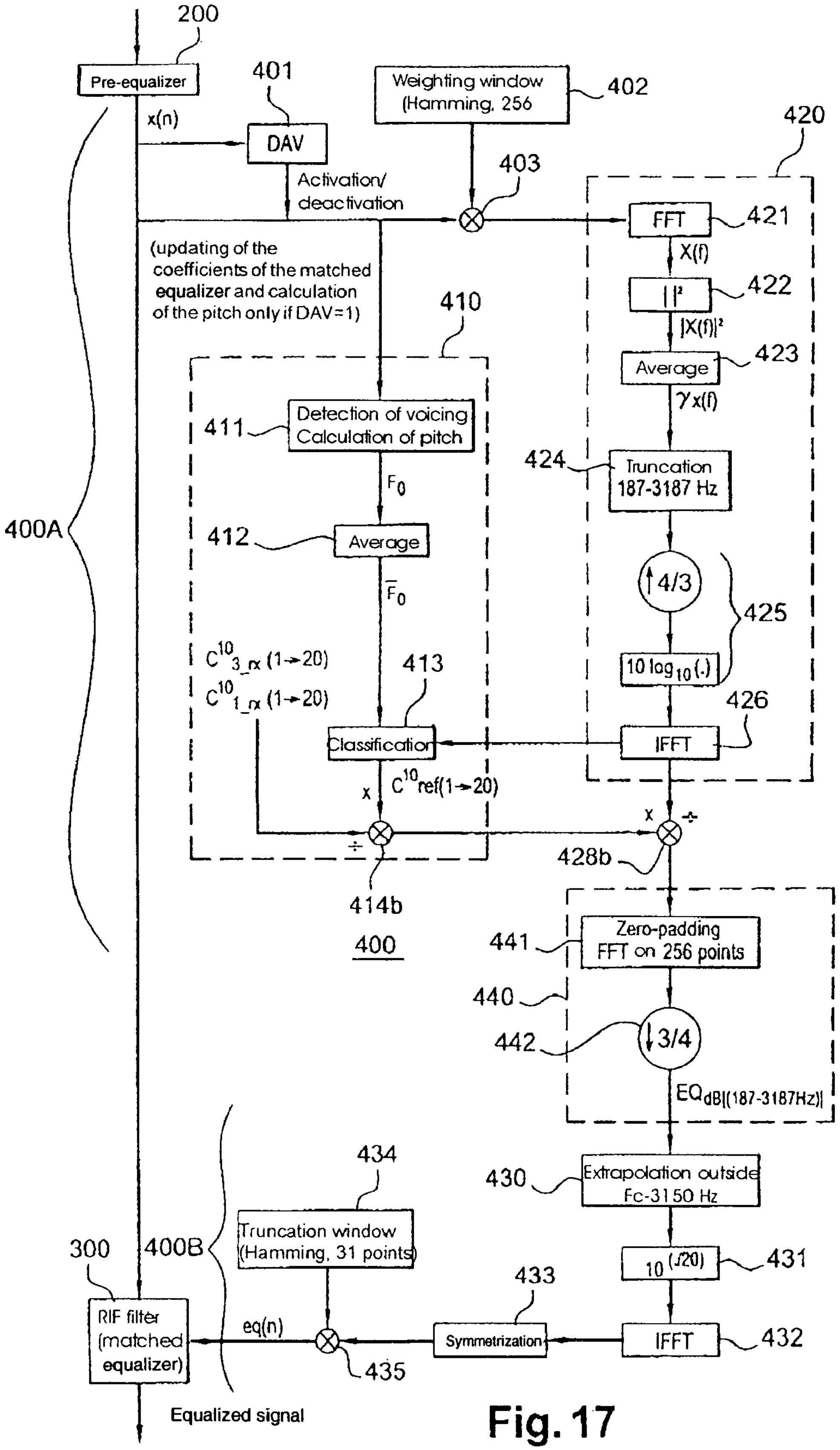

FIG. 16 illustrates the correction system able to implement the method. FIG. 17 illustrates this system according to a variant embodiment as will be detailed hereinafter. These variants relate to the method of calculating the modulus of the frequency response of the adapted equalizer restricted to the band F1-F2.

The pre-equalizer 200 is a fixed filter whose frequency response, on the band F1-F2, is the inverse of the global response of the analogue part of an average connection as defined previously (UIT-T/P.830, 1996).

The stiffness of the frequency response of this filter implies a long-pulsed response; this is why, so as to limit the delay introduced by the processing, the pre-equalizer is typically produced in the form of an RII filter, $20^{th}$ order for example.

Figure 15:
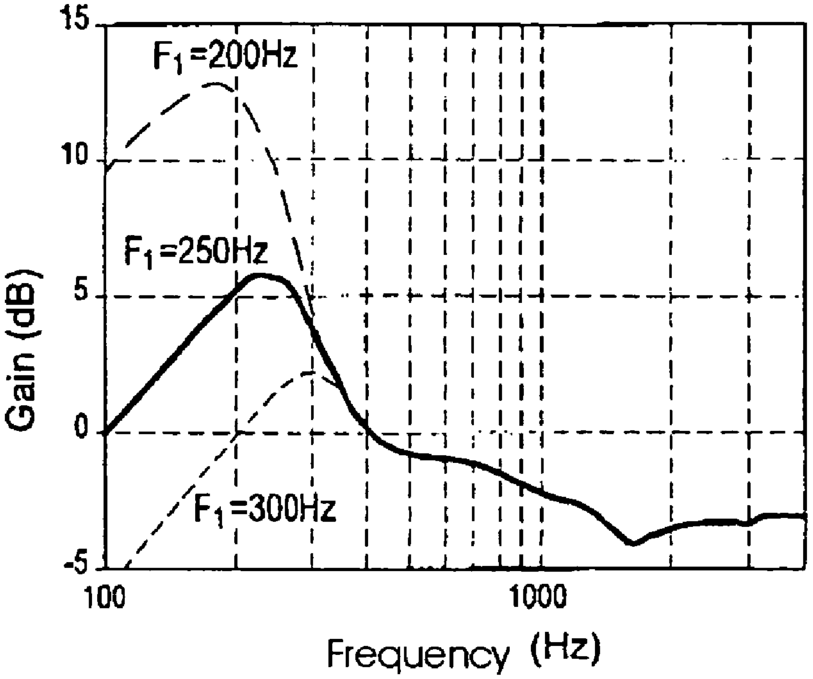

FIG. 15 shows the typical frequency responses of the pre-equalizer for three values of F1. The scattering of the group delays is less than 2 ms, so that the resulting phase distortion is not perceptible.

The processing chain 400 which follows allows classification of the speaker and differentiated matched equalization. This chain comprises two processing units 400A and 400B. The unit 400A makes it possible to calculate the modulus of the frequency response of the equalizer filter restricted to the equalization band: EQ dB (F1-F2).

The second unit 400B makes it possible to calculate the pulsed response of the equalizer filter in order to obtain the coefficients eq(n) of the differentiated filter according to the class of the speaker.

A voice activity frame detector 401 triggers the various processings.

The processing unit 410 allows classification of the speaker.

The processing unit 420 calculates the long-term spectrum followed by the calculation of the partial cepstrum of this speaker.

The output of these two units is applied to the operator 428*a* or 428*b*. The output of this operator supplies the modulus of the frequency response of the equalizer matched for dB restricted to the equalization band F1-F2 via the unit 429 for 428*a*, via the unit 440 for 428*b*.

The processing units 430 to 435 calculate the coefficients eq(n) of the filter.

The output x(n) of the pre-equalizer is analysed by successive frames with a typical duration of 32 ms, with an interframe overlap of typically 50%. For this purpose an analysis window represented by the blocks 402 and 403 is opened.

The matched equalization operation is implemented by an RIF filter 300 whose coefficients are calculated at each voice activity frame by the processing chain illustrated in FIGS. 16 and 17.

The calculation of these coefficients corresponds to the calculation of the pulsed response of the filter from the modulus of the frequency response.

The long-term spectrum of x(n), $\gamma_x$, is first of all calculated (as from the initial moment of functioning) on a time window increasing from 0 to a voice activity duration T (typically 4 seconds), and then adjusted recursively to each voice activity frame, which is represented by the following generic formula:

$$\gamma_x(f,n)=\alpha(n)|X(f,n)|^2+(1-a(n))\gamma_x(f,n-1), \quad (0.10)$$

where $\gamma_x$ (f,n) is the long-term spectrum of x at the $n^{th}$ voice activity frame, X(f,n) the Fourier transform of the $n^{th}$ voice activity frame, and $\alpha(n)$ is defined by equation (0.11). Denoting N the number of frames in the period T, $$\alpha(n)=\frac{1}{\min(n,N)}. \quad (0.11)$$

This calculation is carried out by the units 421, 422, 423.

Next there is calculated, from this long-term spectrum, the partial cepstrum Cp, according to the equation (0.4), used by the processing units 424, 425, 426.

The mean pitch $\overline{F}_0$ is estimated by the processing unit 412 at each voiced frame according to the formula:

$$\overline{F}_0(m)=\alpha(m)F_0(m)+(1-\alpha(m)\overline{F}_0(m-1), \quad (0.12)$$

where F0(*m*) is the pitch of the $m^{th}$ voiced frame and is calculated by the unit 411 according to an appropriate method of the prior art (for example the autocorrelation method, with determination of the voicing by comparison of the standardized autocorrelation with a threshold (UIT-T/G.729, 1996).

Thus, at each voice activity frame, there is a new vector x of components, the mean pitch and the coefficients 1 to L of the partial cepstrum, to which there is applied the discriminating function a defined from the learning corpus. This processing is implemented by the unit 413. The speaker is then allocated to the minimum discriminating score class q.

The modulus in dB of the frequency response of the matched equalizer restricted to the band F1-F2, denoted $|EQ|_{dB(F1-F2)}$, is calculated according to one of the following two methods:

The first method (FIG. 16) consists of calculating $|EQ|_{F1-F2}$ according to equation (0.3), where $\gamma_{ref}(f)$ is the reference spectrum of the class of the speaker (Fourier transform of the class center). This calculation method is implemented in this variant depicted in FIG. 16 with the operators 414*a*, 428*a*, 427 and 429.

The second method (FIG. 17) consists of transcribing equation (0.3) into the domain of the partial cepstrum, and then the partial cepstrum of the output x of the pre-equalization, necessary for the classification of the speaker, is available. Thus equation (0.3) becomes:

$$C_{eq}^P=C_{ref}^P-C_x^P-C_{S\_RX}^P-C_{L\_RX}^P, \quad (0.13)$$

where $C_{eq}^P$, $C_x^P$, $C_{S\_RX}^P$ and $C_{L\_RX}^P$ are the respective partial cepstra of the matched equalizer, of the output x of the pre-equalizer, of the reception system and of the reception line, $C_{ref}^P$ being the reference partial cepstrum, the center of the class of the speaker. The partial cepstra are calculated as indicated before, selecting the frequency band F1-F2. This calculation is made solely for the coefficients 1 to 20, the following coefficients being unnecessary since they represent a spectral fineness which will be eliminated subsequently.

The 20 coefficients of the partial cepstrum of the matched equalizer are obtained by the operators 414*b* and 428*b* according to equation (0.13).

The processing unit 441 supplements these 20 coefficients with zeros, makes them symmetrical and calculates, from the vector thus formed, the modulus in dB of the frequency response of the matched equalizer restricted to the band F1-F2 using the following equation:

$$EQ_{dB(F_1-F_2)}=TFD^{-1}(C_{eq}^P). \quad (0.14)$$

This response is decimated by a factor of ¾, by the operator 442.

For the two variants which have just been described, the values of |EQ| outside the band F1-F2 are calculated by linear extrapolation of the value in dB of $|EQ|_{F1-F2}$, denoted $EQ_{dB}$ hereinafter, by the unit 430 in the following manner:

For each index of frequency k, the linear approximation of $EQ_{dB}$ is expressed by:

$$EQ_{dB}(k)=\alpha_1+\alpha_2 k \quad (0.15)$$

The coefficients a1 and a2 are chosen so as to minimise the square error of the approximation on the range F1-F2, defined by $$e=\sum_{k-k_1}^{k_1}(EQ_{dB}(k)-EQ_{dB}(k))^2 \quad (0.16)$$

The coefficients a1 and a2 are therefore defined by:

$$\begin{pmatrix}a_1\\a_2\end{pmatrix}=\begin{pmatrix}k_2-k_1+1 & \sum_{k=k_1}^{k_1}k\\ \sum_{k=k_1}^{k_2}k & \sum_{k=k_1}^{k_2}k^2\end{pmatrix}^{-1}\begin{pmatrix}\sum_{k=k_1}^{k_2}EQ_{dB}(k)\\ \sum_{k=k_1}^{k_2}kEQ_{dB}(k)\end{pmatrix} \quad (0.17)$$

The values of |EQ|, in dB, outside the band F1-F2, are then calculated from the formula (0.15).

The frequency characteristic thus obtained must be smoothed. The filtering being performed in the time domain, the means allowing this smoothing is to multiply by a narrow window the corresponding pulsed response.

The pulsed response is obtained by an IFFT operation applied to |EQ| carried out by the units 431 and 432 followed by a symmetrization performed by the processing unit 433, so as to obtain a linear-phase causal filter. The resulting pulsed response is multiplied, operator 435, by a time window 434. The window used is typically a Hamming window of length 31 centered on the peak of the pulsed response and is applied to the pulsed response by means of the operator 435.

The invention claimed is:

1. A method of correcting spectral deformations in a voice, introduced by a communication network, comprising an equalization operation on a frequency band, adapted to an actual distortion of a transmission chain, said operation being performed by a digital filter having a frequency response which is a function of a ratio between a reference spectrum and a spectrum corresponding to a long-term spectrum of voice signals of speakers, comprising:

communicating a constitution of classes of speakers with one voice reference per class prior to the equalization of a voice signal of a speaker;

communicating a classification of the speaker, such that the speaker is allocated to the class from predefined classification criteria which causes a voice reference which is closest to the voice of the speaker to correspond to the speaker;

performing equalization of a digitized signal of the voice of the speaker with, as a reference spectrum, the voice reference of the class to which the speaker has been allocated;

wherein communicating the constitution of classes of speakers comprises selecting a corpus of N speakers recorded under non-deteriorated conditions, determining a long-term frequency spectrum of the selected corpus of N speakers, classifying the speakers of the corpus according to their partial cepstrum, and calculating the reference spectrum associated with each class to obtain the voice reference corresponding to each of the classes;

wherein said ceptrum is calculated from the long-term spectrum restricted to the equalization band and by applying a predefined classification criterion to these cepstra to obtain K classes.

2. The method of correcting spectral voice deformations according to claim 1, wherein the reference spectrum on the equalization frequency band, associated with each class, is calculated by Fourier transform of a center of a class defined by its partial cepstra.

3. The method of correcting spectral voice deformations according to claim 1, wherein the classification of a speaker comprises:

use of a mean pitch of the voice signal and partial cepstrum of the voice signal as classification parameters; and applying a discriminating function to the classification parameters to classify the speaker.

4. The method of correcting spectral voice deformations according to claim 1, further comprising:

pre-equalizing the digitized signal by a fixed filter having a frequency response in the frequency band, corresponding to an inverse of a reference spectral deformation introduced by a telephone connection.

5. The method of correcting spectral voice deformations according to claim 1, wherein the equalization of the digitized signal of the voice of the speaker comprises:

detection of voice activity on a reception line to trigger a concatenation of processes comprising calculation of the long-term spectrum, the classification of the speaker, calculation of a modulus of the frequency response of the equalizer filter restricted to the equalization band and calculation of coefficients of the digital filter differentiated according to the class of the speaker, from this modulus, control of the filter with the coefficients obtained, and filtering of a signal emerging from a pre-equalizer by the filter.

6. The method of correcting spectral voice deformations according to claim 5, wherein the calculation of the modulus of the frequency response of the equalizer filter restricted to the equalization band is achieved in accordance with the following relationship:

$$|EQ(f)| = \frac{1}{|\mathrm{S\_RX}(f)\cdot \mathrm{L\_RX}(f)|}\sqrt{\frac{\gamma_{ref}(f)}{\gamma_x(f)}},$$

wherein $\gamma_{ref}(f)$ is the reference spectrum of the class to which the speaker belongs, L_RX is a frequency response of the reception line, S_RX is the frequency response of a reception signal and $\gamma_x(f)$ is the long-term spectrum of an input signal of the filter.

7. The method of correcting spectral voice deformations according to claim 5, wherein the calculation of the modulus of the frequency response of the equalizer filter restricted to the equalization band is achieved in accordance with the following relationship:

$$C_{eq}^P = C_{ref}^P - C_x^P - C_{S\_RX} C - _{L\_RX},$$

wherein $C_{eq}^P$, $C_x^P$, $C_{S\_RX}^P$ and $C_{L\_RX}$ are respective partial cepstra of the adapted equalizer, the input signal x of the equalizer filter, a reception system and the reception line, $C_{ref}^P$ being the reference partial cepstrum, a center of the class of the speaker; and wherein the modulus restricted to the band being calculated by discrete Fourier transform of $C_{eq}^P$.

8. A system for correcting voice spectral deformations introduced by a communication network, comprising adapted equalization means in a frequency band, said adapted equalization means comprising:

a digital filter having a frequency response which is a function of a ratio between a reference spectrum and a spectrum corresponding to a long-term spectrum of a voice signal; and signal processing means for calculating coefficients of the digital filter; said signal processing means including:

a first signal processing unit for calculating a modulus of a frequency response of an equalizer filter restricted to an equalization band according to the following relationship:

$$|EQ(f)| = \frac{1}{|\mathrm{S\_RX}(f)\cdot \mathrm{L\_RX}(f)|}\sqrt{\frac{\gamma_{ref}(f)}{\gamma_x(f)}},$$

wherein $\gamma_{ref}(f)$ is the reference spectrum, which may be different from one speaker to another and which corresponds to a reference for a predetermined class to which a speaker belongs, L_RX is a frequency response of a reception line, S_RX is the frequency response of a reception signal and $\gamma_x(f)$ is the long-term spectrum of an input signal of the filter; and a second signal processing unit for calculating a pulsed response from the calculated frequency response modulus to determine coefficients of the equalizer filter differentiated according to the constitution of different speaker classes; wherein the classes of speakers are determined by selecting a corpus of N speakers recorded under non-deteriorated conditions, determining a long-term frequency spectrum of the N speakers of the selected corpus, classifying the speakers of the corpus according to their partial cepstrum by applying a predefined classification criterion to these cepstra to obtain K classes, and calculating the reference spectrum associated with each class to obtain the voice reference corresponding to each of the classes; and wherein a partial cepstrum of a speaker is calculated from the speaker's long-term spectrum restricted to the equalization band.

9. The system for correcting spectral voice deformations according to claim 8, wherein the first processing unit comprises means for calculating a partial cepstrum of the equalizer filter according to the following relationship:

$$C_{eq}^{P}=C_{ref}^{P}-C_{x}^{P}-C_{S\_RX}-C_{L\_RX}^{P},$$

wherein $C_{eq}^{P}$, $C_{x}^{P}$, $C_{S\_RX}^{P}$ and $C_{L\_RX}^{P}$ are respective partial cepstra of an adapted equalizer, an input signal of the equalizer filter, a reception signal and a reception line, $C_{ref}^{P}$ being a reference partial cepstrum, a center of a class of the speaker; and wherein the modulus of the equalizer filter restricted to the frequency band is calculated by discrete Fourier transform of $C_{eq}^{P}$.

10. The system for correcting spectral voice deformations according to claim 9, wherein the first processing unit comprises a sub-assembly for calculating partial cepstrum coefficients of a speaker who is communicating and a second sub-assembly for effecting a classification of the communicating speaker, said second sub-assembly comprising a block for calculating a pitch, a block for estimating a mean pitch from the calculated pitch, and a classification block for applying a discriminating function to a vector having the mean pitch and the coefficients of the partial cepstrum for classifying the speaker as its components.

11. The system for correcting spectral voice deformations according to claim 8, wherein the first processing unit comprises a sub-assembly for calculating partial cepstrum coefficients of a speaker who is communicating and a second sub-assembly for effecting a classification of the communicating speaker, said second sub-assembly comprising a block for calculating a pitch, a block for estimating a mean pitch from the calculated pitch, and a classification block for applying a discriminating function to the vector having the mean pitch and the coefficients of the partial cepstrum for classifying the speaker as its components.

12. The system for correcting spectral voice deformations according to claim 8, further comprising:

a pre-equalizer;

wherein a signal equalized from reference spectra differentiated according to the class of the speaker is an output signal of the pre-equalizer.

* * * * *